United States Patent [19]

Goebel

[11] Patent Number: 4,932,711

[45] Date of Patent: Jun. 12, 1990

[54] AUTOMOBILE WINDSHIELD SHADE

[76] Inventor: Kenneth D. Goebel, 3919 Barclay, Amarillo, Tex. 79109

[21] Appl. No.: 365,756

[22] Filed: Jun. 13, 1989

[51] Int. Cl.⁵ ............................................. B60J 3/02
[52] U.S. Cl. ...................... 296/97.7; 296/97.8; 160/84.1; 160/370.2
[58] Field of Search .............. 296/97.1, 97.7, 97.8, 296/97.3; 160/84.1, 370.2

[56] References Cited

U.S. PATENT DOCUMENTS

| | | | |
|---|---|---|---|
| 1,814,293 | 7/1931 | Christie | 296/97.3 |
| 3,003,812 | 10/1961 | Haugland | 296/97.7 |
| 3,183,033 | 5/1965 | Stulbach | 296/97.7 |
| 4,335,773 | 6/1982 | Masi | 160/370.2 |
| 4,560,245 | 12/1985 | Sarver | 296/97.8 |
| 4,647,102 | 3/1987 | Ebrahimzadeh | 296/97.8 |
| 4,736,980 | 4/1988 | Eubanks | 296/97.8 |
| 4,758,042 | 7/1988 | Liu | 296/97.7 |
| 4,775,180 | 10/1988 | Phillips | 296/97.7 |

FOREIGN PATENT DOCUMENTS 62128827  6/1987  Japan .................. 296/97.8

Primary Examiner—Margaret A. Focarino
Assistant Examiner—Gary C. Hoge
Attorney, Agent, or Firm—Wendell Coffee

[57] ABSTRACT

A base in the form of a tube is attached to the dash of automobile. The bottom of an accordion pleated shade is attached to the base. A strip of pliant fabric is attached to the top of the shade. A batten at the top of the pliant fabric is used to hook the shade up. Strings extend through the pleated fabric to a slat located between the pleated fabric and pliant fabric. Tension means at the base pulls the strings down to collapse the pleated fabric. The pliant fabric covers the collapsed pleated fabric and base.

15 Claims, 3 Drawing Sheets

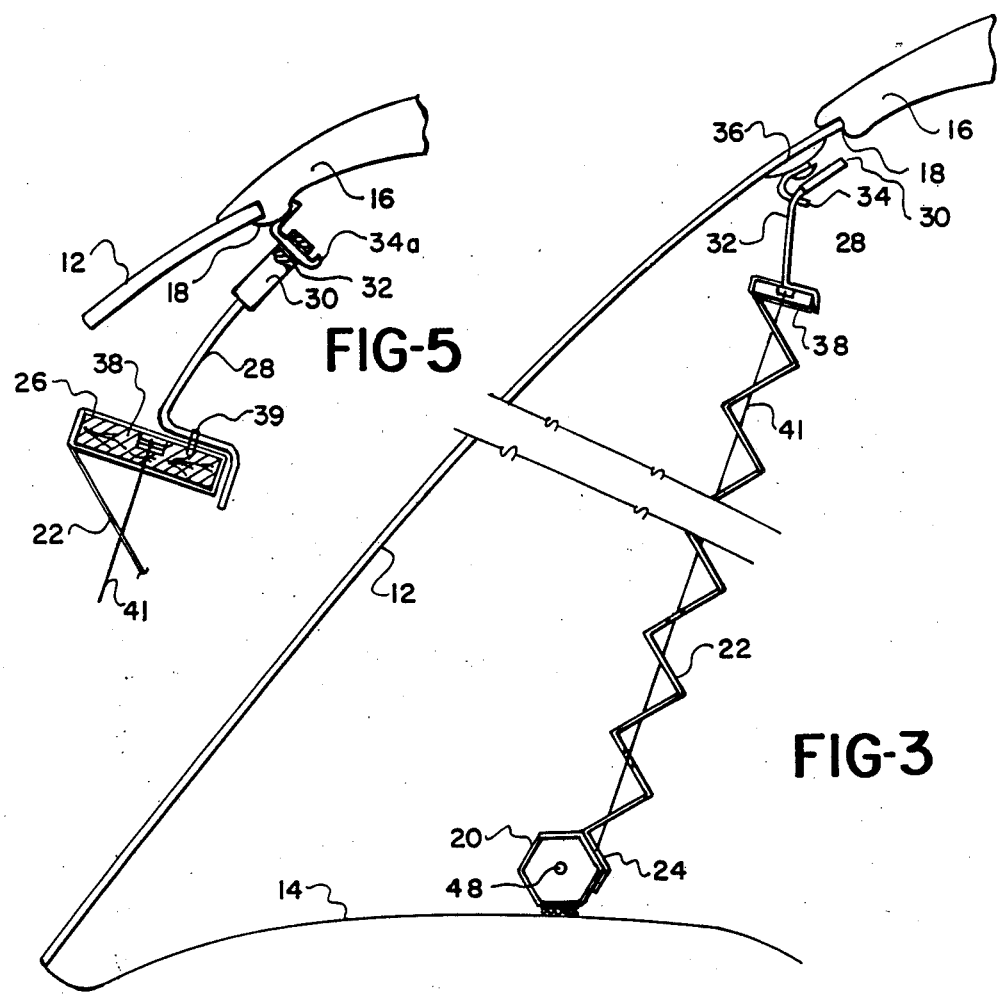
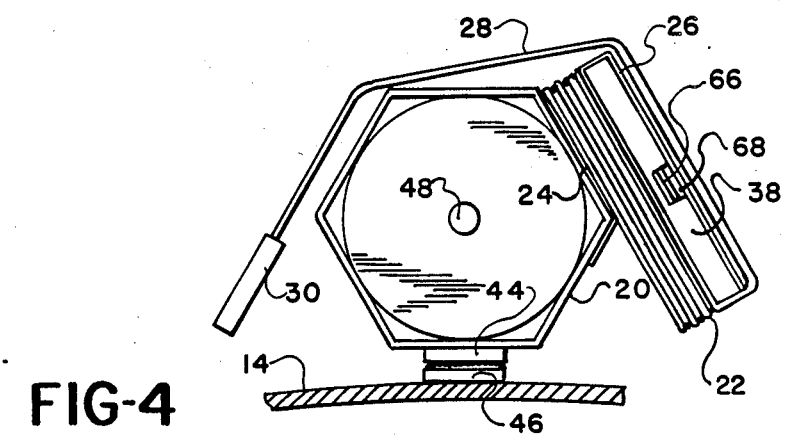

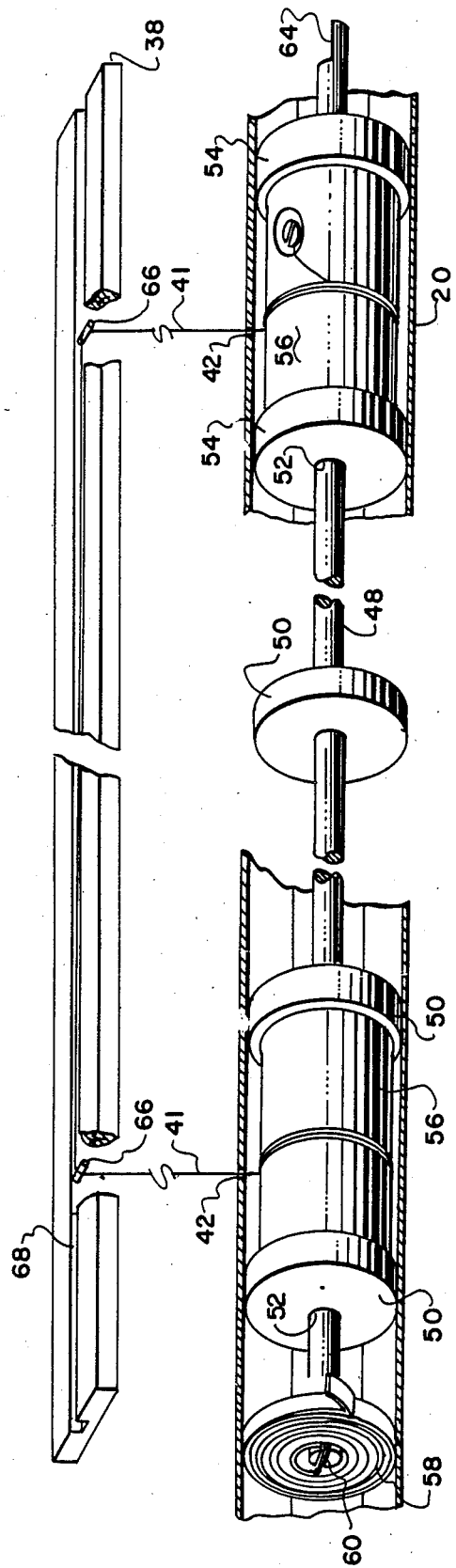
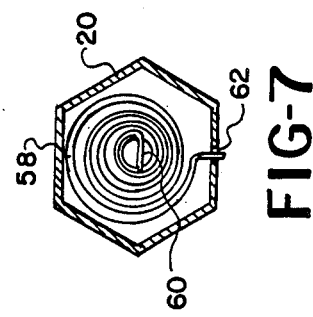
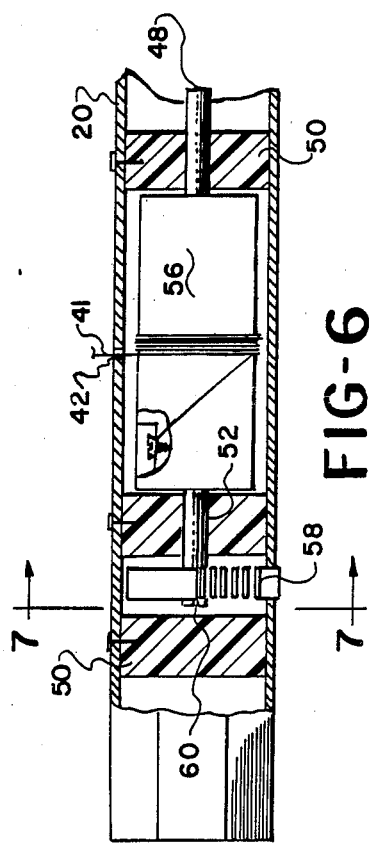

AUTOMOBILE WINDSHIELD SHADE

RIGHTS TO INVENTIONS UNDER FEDERAL RESEARCH

There was no federally sponsored research and development concerning this invention.

BACKGROUND OF THE INVENTION (1) Field of the Invention

This invention relates to vehicles and more particularly to window shades for automobiles when parked. Applicant submits that an ordinary automobile driver is one having ordinary skill in this art.

(2) Description of the Related Art

In certain areas solar radiation is particularly high. In these areas parked vehicles, and particularly automobiles, get extremely hot on the interior. Modern car designs feature a large number of windows many of which are slanting rather than vertical. These slanted windows allow the solar radiation to heat the interiors' of the automobiles to temperatures well above 150 degrees Fahrenheit. The problem is aggravated because most people desire to close the windows and lock the doors of the car for security reasons.

Early solutions to this problem included putting newspapers or towels over the windows and rolling the windows up. This was a reasonably satisfactory provision for the side windows that roll up and down, but it is no solution at all for the windshield and the rear window of an automobile.

In recent years embodiments of Levy's U.S. Pat. No. 4,202,396 have become commercially available and in widespread use. Before that time, many patents had been issued to attempt to solve this problem.

Before this application was filed, the applicant was aware of the following U.S. patents:

| | |
|---|---|
| 1,814,293 | V. J. Christie |
| 1,959,137 | K. I. Miller |
| 3,003,812 | G. D. Haugland |
| 3,183,033 | N. Stulbach |
| 4,558,899 | Chu et al. |
| 4,560,245 | Sarver |
| 4,647,102 | Ebrahimzadeh |
| 4,736,980 | Eubanks |
| 3,946,788 | van Muyen |
| 4,518,025 | Judkins |
| 4,557,309 | Judkins |
| 4,673,018 | Judkins |

These Patents are of interest because it appears that all of these Patents except the three to Judkins and one to van Muyen are related to this problem To applicants knowledge none of these Patents except Judkins have been widely used in the United States.

The Judkins patents are of interest because these patents issued assigned to by Verosol, which widely distributes pleated type of curtain or shade or sun-blind material.

van Muyen is of interest because it also has pleated type of material and shows the overlapping connection of two sections of this type of material.

SUMMARY OF THE INVENTION (1) Progressive Contribution to the Art

I have invented an improvement for automobile sun shades.

Basically my improvement includes the basic curtain material which is commercially on the market known as Verosol Curtains curtains which are made of accordion pleated fabric. These curtains are mounted so that they fold flat at the bottom structure of a window. On a windshield, where most of the curtains will be used, they would be mounted upon the dash of the automobile which might be more accurately described as the cowl above the instrument panel. The shades are pulled upward manually to be attached to a hook at the top of the window. The shades are retracted by a spring or roller inside of a tube which was mounted upon the top of the dash. The shade material would lie on top of the tube in the retracted position. A panel or strip of pliable fabric is attached to the top of the pleated fabric. The pliable fabric would be preferably a fabric that would coordinate with the colors of the interior of the automobile but most importantly would be a non-glare material. When the automobile is in use, the pliable fabric would cover the tube and the accordion folded fabric on top of the dashboard so that the tube and folded curtain did not distract the driver and particularly so that it would not produce a glare which would distract the driver.

(2) Objects of this Invention

An object of this invention is to provide a convenient sun shade for a vehicle.

Another object of this invention is to provide a sun shade for the windshield of an automobile which not only prevents radiation into the automobile when the automobile is parked, but also which is pleasant in appearance and not distracting to the driver when the vehicle is in operation.

Further objects are to achieve the above with devices that are sturdy, compact, durable, lightweight, simple, safe, efficient, versatile, ecologically compatible, energy conserving, pleasing in appearance, and reliable, yet inexpensive and easy to manufacture, connect, attach, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 3 is a sectional view of the shade showing it in the raised position.

FIG. 4 is a sectional view of the shade showing it in the folded or collapsed position.

FIG. 5 is a sectional view showing an alternate embodiment for the attachment of the shade to the roof.

FIG. 6 is a longitudinal section through a portion of the tube on the dash.

FIG. 7 is a sectional view taken substantially on line 7—7 of FIG. 6.

FIG. 8 is a perspective view with parts broken away for showing the mechanism for operation.

Figure 1:
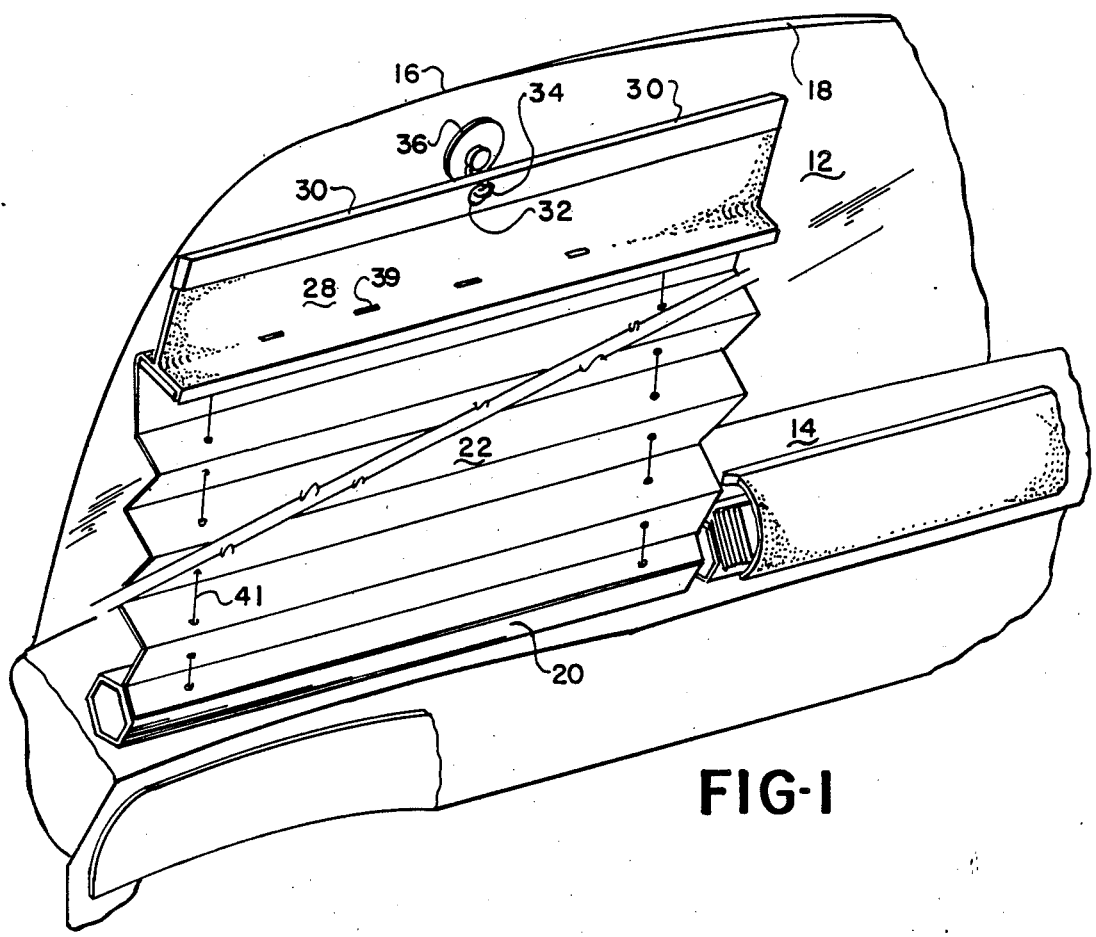
FIG. 1 is a perspective view from the interior of the automobile showing the windshield with two shades, one of which is shown in the raised position and the other of which is shown in the folded position.
Figure 2:
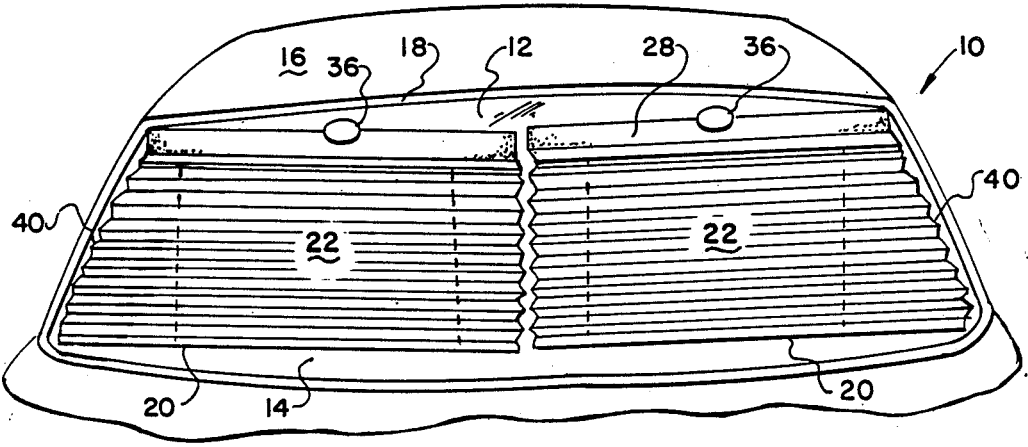
FIG. 2 is a front elevational view showing the two shades with both shades in the raised position.

As an aid to correlating the terms of the claims to the exemplary drawing, the following catalog of elements and steps is provided:

10—automobile

12—windshield
14—dash
16—roof
18—top juncture
20—tube
22—pleated fabric
24—lower panel
26—upper panel
28—strip of pliant fabric
30—batten
32—hole, hook
34—hook
36—suction cup
38—slat
39—stitches
40—edges
41—strings
42—holes, tube
44—Velcro, tube
46—Velcro, dash
48—shaft
50—bearing disc
52—hole, disc
54—periphery
56—spool
58—coil spring
60—notch, shaft
62—slot, tube
64—flat, shaft
66—pins
68—longitudinal groove

DESCRIPTION OF THE PREFERRED EMBODIMENTS

Referring to the drawings, there may be seen illustrated automobile 10 having windshield 12. As illustrated, the windshield will have dash 14 beneath the windshield and roof 16 above the windshield. Those having ordinary skill in the art will recognize, of course; that an automobile is a vehicle, that a windshield is a window in the vehicle, that the dash is a fixed structure below the window, and that the roof is a fixed structure above the window. The window will make a top juncture 18 between the window and the roof above the window.

Tube 20 is attached to the top of the dash 14. Preferably the tube 20 extends to the edge of the windshield 12 at the dash.

The tube is illustrated of synthetic material such as polypropylene however, any rigid material either metal or plastic is suitable. A tube of hexagonal cross-section is shown, however this is not essential. I have had good success using a tube about 1" in diameter.

The tube could be in the form of a wooden strip attached to the dash with a plastic cover. The tube forms a base on the dash to attach other elements.

Accordion pleated shade material 22 is attached to the tube 20 as seen in the drawings, particularly FIG. 1 and 3. The accordion pleated fabric is commercially available on the market and is often known by the trademark, Verosol.

The pleated fabric 22 will have a plurality of panels, for example, it will have lower panel 24 and upper panel 26. The lower panel is attached as by an adhesive to an upper surface of the tube 20. The upper panel 26 is attached as by an adhesive to a strip of pliant fabric 28. Batten 30 is attached to the top of the strip of pliant fabric 28. Preferably the pliant fabric is formed into the shape of a tube or a hem at the top and the batten 30 is inserted therethrough.

The batten 30 is a thin strip of wood, metal, or synthetic material which is flexible in a horizontal direction so that the top or the shade may conform to any curve in the windshield 12 at the juncture 18. The batten 30 has sufficient width or height so that it is stiff in a vertical direction so that the ends of the shade do not droop down at the edges.

Hole 32 extends through the pliant fabric 28 near the batten 30 at approximately the midpoint thereof as seen in FIGS. 1 and 3. Hook 34 on suction cup 36 is attached to the windshield 12 near the top juncture 18. The hook extends through the hole 32 to hold the shade up.

A second embodiment is seen in FIG. 5. Hook 34a is attached to the roof 16 adjacent or near the top juncture 18.

Slat 38 is between the upper panel 26 and the bottom of the strip of pliant fabric 28. The slat 38 aids in the correct positioning of the shade when it is in the fully extended or up position, and, more important, it helps to keep the pliant fabric correctly positioned over the tube 20 and the collapsed accordion pleated fabric 22 as seen in a portion of FIG. 1 and FIG. 4.

The main purpose of the pliant fabric is so that, in the collapsed position, it extends over the tube and the collapsed fabric to present a smooth, pleasing appearance to the dash of the automobile while being operated. Stitches 39 attach the pliant fabric 28 and upper panel 26 so they are correctly oriented in the raised position.

When people are using the automobile, the pleated fabric 22 will be collapsed. Therefore, it is more important that it present a pleasing appearance to the occupants in the retracted position during the automobile's use than when it is in the fully raised or extended position. Not only should the pliant fabric be of a texture and color to compliment the interior design of the car but it is also important that it be of a non-glare material so that it does not distract the driver either by clash of colors or by reflection of light. In this regard not only does it cover the tube and folded shade when it is in the covering position or the collapsed position, but it also prevents any of the exterior of the pleated material from presenting a glare. It will be understood that the accordion pleated shade fabric 22 is available with a reflected outer surface to better insulate or to reflect the solar radiation. The main purpose of having the shade in the raised position is to reflect the solar radiation and to prevent it from heating the interior of the vehicle 10.

The pliant fabric 28 is attached to the upper panel 26 by sewing a seam or series of stitches 39. The upper panel is formed into a sleeve or tube. Slat 39 is telescoped or inserted into the sleeve or tube of the upper panel 26. This attachment provides both the strength in the raised position and the proper lay of the fabric in the collapsed position.

The edges 40 of the pleated fabric 22 may be tapered so that they fit the entire area of the windshield. It is not necessary for them to be cut square with the pleats. The windshields, if not square, are always larger at the bottom. Therefore it is advantageous to have the tube mounted at the bottom of the windshield.

Preferably the tube 20 is attached to the dash 14 by Velcro. One portion 44 of the Velcro material may be attached to the bottom of the tube 20 by adhesive and the remaining portion 46 of the Velcro may be attached to the top of the dash 14. The Velcro grips sufficiently to hold the tube in place but still permits it to move slightly for purpose of adjustment. Also many persons will desire to remove the shades during the Winter and store them until Spring. It will be understood that the tube 20 is attached to the dash 14 so that the axis of the tube is horizontal.

For the proper operation of the pleated shade fabric 22, two strings 41 run from the tube 20 to the slat 38 through holes in the fabric as is well known in the art (see Judkins Patents noted above). These strings extend into the tubes 20 through openings or holes 42 in the tube 20. The strings 41 are attached to a tension means within the tube for pulling the strings into the tube.

One form of the tension means includes shaft 48 extending along the axis of the tube 20 for substantially the entire length of the tube (see FIG. 8). A plurality of shaft guides or bearing discs 50 are placed within the tube. Each of the bearing discs will have hole 52 therethrough. The shaft 48 will be journaled through the hole 52 for rotation within the disc 50 and therefore within the tube 20. Each of the bearing discs 50 will have a periphery 54 which is against the inside of the tube. Preferably the discs 50 will be fixed and positioned inside of the tube by a small screw extending through the tube and into the disc or by adhesive material.

I prefer to use at least two strings 41 for each of the shades and therefore for each tube 20. However, in some cases more than two strings might be used. Spool 56 is provided for each string 41. Each spool is attached to the shaft 48 by a set screw so that the spool rotates with the shaft. The spools are located immediately below the holes 42 through which the strings 41 enter The strings are wound around the spools 56 and are anchored by the set screw which holds the spools to the shaft 48.

The shaft 48 is biased by coil spring 58. The coil spring has one end inserted through notch 60 on one end of the shaft 48. The other, or outside end of the coil spring 58 bends through slot 62 in the tube 20. The other end of the shaft 48 which does not have the notch 60 therein has flat 64 thereon. The flat may be engaged by a tool, such as a wrench or a pair of pliers, so that the spring 58 may be wound to have a certain amount of tension thereon even when the shade is collapsed and the strings 41 are fully wound. That is to say that, even in the collapsed position with the strings 41 fully wound upon the spools 56, the spring 58 will still be biasing the strings inward into the tube 20.

So that the strings 41 will always be even and exert tension upon the intermediate slat 38, the strings 41 are looped over pins 66 extending within the longitudinal groove 68 within the slat 38. The two strings 41 are attached together with the groove 68. The two strings 41 might be considered a single string since the attachment in the groove is a continuation of each. The pins 66 function as pulleys so that if one of the spools 56 retrieves the string before the other spool that the strings will equalize over the pins so that the slat is snuggly held along the tube for its entire length.

Therefore it may be seen that I have provided a shade for automobile windshields or the rear windows of an automobile or for the windows of any vehicle. It is easy to manufacture, easy to install, convenient to use and pleasing in appearance.

The embodiments shown and described above are only exemplary. I do not claim to have invented all the parts, elements or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. In a vehicle having
   a. windows
   b. fixed structure below each of the windows,
   c. fixed structure above each of the windows, and
   d. a top juncture of each of the windows and the fixed structure above the window;
   e. the improved shade comprising:
   f. an elongated tube having an axis,
   g. grip means for fastening the tube with its axis horizontal to the fixed structure below one of the windows,
   h. accordion pleated fabric with a plurality of panels with
   i. a lower panel attached to said tube,
   j. a batten connected to an upper panel of the pleated fabric,
   k. hook means on the batten for fastening the batten near the top juncture,
   l. at least two strings, each string extending from the upper panel through each of the panels to the tube, and into the tube; and
   m. tension means in the tube for pulling the strings into the tube.

2. The invention is defined in claim 1 wherein said grip means is in the form of Velcro, a portion of which is attached to the tube and a portion of which is attached to the fixed structure below the window.

3. The invention is defined in claim 1 wherein said hook means includes:
   n. a hook on
   o. a suction cup which is attached to the window near the top thereof, and
   p. a hole in the upper panel connected to the batten with said hook through said hole.

4. The invention is defined in claim 1 wherein said hook means includes:
   n. a hook which is attached to the fixed structure above the window.

5. The invention is defined in claim 1 wherein said tension means includes:
   n. a shaft extending along the axis of the tube for substantially the length of the tube,
   o. a plurality of bearing discs,
      i. each bearing disc having an outer periphery against the inside of the tube,
      ii. each of the bearing disc having a hole through which the shaft is rotatable journaled,
   p. two spools on the shaft,
   q. one said strings wound on each of the spools, and
   r. a coiled spring extending between the shaft and the tube to rotate the shaft to wind the strings on the spools.

6. The invention as defined in claim 1 further comprising:
   n. a strip of pliant fabric connecting the top panel of the pleated fabric to the batten,
   o. said pliant fabric forming a cover over the tube and the pleated fabric collapsed upon the tube when the shade is in the down position and said pliant fabric resting upon the fixed structure below the window.

7. The invention is defined in claim 6 wherein said tension means includes:
p. a shaft extending along the axis of the tube for substantially the length of the tube,
q. a plurality of bearing discs,
  i. each bearing disc having an outer periphery against the inside of the tube,
  ii. each of the bearing disc having a hole through which the shaft is rotatable journaled,
r. two spools on the shaft,
s. one of said strings wound on each of the spools, and
t. a coiled spring extending between the shaft and the tube to rotate the shaft to wind the strings on the spools.

8. The invention is defined in claim 7 wherein said grip means is in the form of Velcro, a portion of which is attached to the tube and a portion of which is attached to the fixed structure below the window.

9. The invention as defined in claim 8 wherein said hook means includes:
u. a hook on
v. a suction cup which is attached to the window near the top thereof, and
w. a hole in the upper panel connected to the batten with said hook through said hole.

10. The invention as defined in claim 8 wherein said hook means includes:
u. a hook which is attached to the fixed structure above the window.

11. In an automobile having
a. a windshield having a center and two edges, one edge on each side of the center,
b. a dash below the windshield,
c. a roof above the windshield, and
d. a top juncture between the windshield and the roof; the improved shade comprising:
e. at least one elongated tube having an axis,
f. Velcro on the bottom of the tube,
g. Velcro on the top of the dash,
h. said strips of Velcro arranged and constructed for fastening the tube with its axis horizontal to the dash below the windshield,
j. accordion pleated fabric with a plurality of panels with
k. the lower panel thereof adhered to said tube,
l. a slat attached to the upper panel of the pleated fabric,
m. a strip of pliant fabric having a top edge and a bottom edge attached to said slat,
n. a batten attached to the top edge of said strip of pliant fabric,
o. a hole in the pliant fabric near the batten fastening the batten near the to puncture,
p. at least two strings, each string extending from the slat through each of the panels of the pleated fabric to the tube and into the tube,
q. a shaft extending along the axis of the tube for substantially the length of the tube,
r. a plurality of bearing discs,
  i. each bearing disc having an outer periphery against the inside of the tube,
  ii. each of the bearing discs having a hole through which the shaft is rotatably journaled,
s. spools on the shaft, one of said strings wound on each spool, and
t. a coil spring extending between the shaft and the tube to rotate the shaft to wind the strings on the spools.

12. The invention as defined in claim 11 further comprising:
u. there being two strings,
v. a longitudinal groove in the slat, and
w. two pins extending across the groove,
x. said two strings attached together within the groove and each string extending over a pin and thus through the panels of pleated fabric.

13. The invention as defined in claim 12 wherein there are two tubes, one tube extending from the center of the windshield to one edge of the windshield and the other tube extending from the center of the windshield to the other edge of the windshield.

14. The invention as defined in claim 13 further comprising:
y. a hook attached to
z. a suction cup which is attached to the windshield near the top thereof, said hook fastened in the hole at the batten.

15. The invention as defined in claim 13 further comprising:
y. a hook attached to the roof above the windshield and fastened in a hole at the batten.

* * * * *